US012660839B2

(12) United States Patent
Cerne et al.

(10) Patent No.: US 12,660,839 B2
(45) Date of Patent: Jun. 23, 2026

(54) METHOD TO PREPARE A MIXTURE AND FOOD PRODUCTS DERIVING THEREFROM

(71) Applicant: DR. SCHÄR S.P.A., Burgstall (IT)

(72) Inventors: Virna Lucia Cerne, Duino-Aurisina (IT); Ombretta Polenghi, Trieste (IT)

(73) Assignee: DR. SCHÄR S.P.A., Burgstall (IT)

( * ) Notice: Subject to any disclaimer, the term of this patent is extended or adjusted under 35 U.S.C. 154(b) by 816 days.

(21) Appl. No.: 18/009,709

(22) PCT Filed: Jun. 8, 2021

(86) PCT No.: PCT/IT2021/050176
§ 371 (c)(1),
(2) Date: Dec. 9, 2022

(87) PCT Pub. No.: WO2021/250712
PCT Pub. Date: Dec. 16, 2021

(65) Prior Publication Data
US 2023/0232874 A1    Jul. 27, 2023

(30) Foreign Application Priority Data
Jun. 9, 2020    (IT) ......................... 102020000013675

(51) Int. Cl.
*A23L 7/104*    (2016.01)
*A23L 7/109*    (2016.01)

(52) U.S. Cl.
CPC .............. *A23L 7/109* (2016.08); *A23L 7/104* (2016.08)

(58) Field of Classification Search
CPC ........ A21D 13/066; A23L 7/104; A23L 7/109
See application file for complete search history.

(56) References Cited

U.S. PATENT DOCUMENTS

| | | | |
|---|---|---|---|
| 3,262,783 A * | 7/1966 | Blanchon | A21D 2/38 |
| | | | 426/31 |
| 7,563,864 B2 | 7/2009 | Marti et al. | |
| 8,778,338 B2 | 7/2014 | Gass et al. | |
| 8,796,201 B2 | 8/2014 | Shan et al. | |
| 9,427,008 B2 | 8/2016 | Kelly et al. | |
| 2005/0271787 A1 * | 12/2005 | Doud | A23L 7/109 |
| | | | 426/557 |
| 2016/0114009 A1 | 4/2016 | Cavaletti et al. | |

FOREIGN PATENT DOCUMENTS

| | | | | |
|---|---|---|---|---|
| WO | WO-2008/053310 A2 | 5/2008 | | |
| WO | WO-2011157806 A1 * | 12/2011 | ............... | A23J 1/12 |
| WO | WO-2012/174127 A1 | 12/2012 | | |
| WO | WO-2014/011662 A2 | 1/2014 | | |
| WO | WO-2014/033765 A1 | 3/2014 | | |
| WO | WO-2014/053891 A1 | 4/2014 | | |
| WO | WO-2015/052665 A1 | 4/2015 | | |
| WO | WO-2017/103214 A1 | 6/2017 | | |
| WO | WO-2018/234382 A1 | 12/2018 | | |

OTHER PUBLICATIONS

International Search Report and Written Opinion for PCT/IT2021/050176, mailed Oct. 6, 2021.
Di Cagno et al., "Gluten-free sourdough wheat baked goods appear safe for young celiac patients: a pilot study", Journal of Pediatric Gastroenterology and Nutrition, vol. 51, No. 6, pp. 777-783, 2010.

* cited by examiner

*Primary Examiner* — Jenna A Watts
(74) *Attorney, Agent, or Firm* — MARSHALL, GERSTEIN & BORUN LLP

(57)    ABSTRACT
A method to prepare a mixture to make cereal-based food products which natively contain gluten includes a step of mixing cereal flour and a step of preparing a mixture obtained by mixing a hydrolyzed flour composition with a transglutaminase enzyme and with a source of lysine.

14 Claims, 1 Drawing Sheet

10

10

METHOD TO PREPARE A MIXTURE AND FOOD PRODUCTS DERIVING THEREFROM

FIELD OF THE INVENTION

Embodiments described here concern a method to prepare a mixture to make food products which, although based on cereal flour natively containing gluten, are in any case suitable for people suffering from pathologies immune-mediated by gluten, such as for example people suffering from celiac disease, non-celiac gluten sensitivity (NCGS), gluten ataxia, Duhring's dermatitis herpetiformis, gluten allergy.

The food products can comprise oven-baked products, for example bread, biscuits, cakes, crackers, breadsticks, possibly leavened, or even products of other types, such as for example pasta, or suchlike. The flours used can be, for example, wheat, barley or rye flour.

BACKGROUND OF THE INVENTION

Cereal-based food products are known, in particular oven-baked products, such as for example bread, biscuits, cakes, pastry products, or even of different types, such as for example pasta, obtained from mixtures, which use cereal flours as the main ingredient.

These food products can be prepared from the mixture in different ways, for example by possible leavening, baking, possible drying, extrusion and possible cooling.

The factors that contribute to a good quality of these food products are related to the amino acid composition, structure and polymeric nature of the proteins present in the workable mixture.

The workable mixture therefore requires a balance between elasticity and extensibility in order to maximize the quality of the food products obtainable from it.

Workable mixtures are typically prepared by mixing a cereal flour natively containing gluten, for example wheat, barley, rye, spelt, kamut, hulled wheat and triticale, with water.

In particular, wheat is unique among cereals due to the fact that its flour has the ability to form a viscoelastic lattice when mixed with water at room temperature (Lawton, 1992; Hui et al. 2006).

The genus Triticum includes several species of considerable food importance, among which: *T. durum* (durum wheat), *T. aestivum* (soft wheat), *T. monococcum* (einkorn wheat), *T. turgidum* subsp. dicoccum (Emmer wheat), *T. aestivum* subsp. spelta (spelt).

Other important foodstuffs are barley (Hordeum vulgare) and rye (Secale cereale).

It is known that cereal proteins can be classified into four fractions, also known as Osborne fractions, according to their solubility (Osborne, T. B. (1907). "The proteins of the wheat kernel." Carnegie Inst.: Wash., DC; Osborne, T. B. (1924). "The vegetable proteins". Longmans, Green and Co., London): albumins, globulins, prolamines and gluteline. Osborne fractions deriving from different cereals are often identified with specific names.

In the genus Triticum, prolamines and glutelines are called gliadins and glutenins, respectively.

The glutenin fraction is formed by a mixture of high molecular weight (HMW) and low-molecular-weight (LMW) polymers. Using SDS-PAGE electrophoretic analysis, HMWs have a molecular weight comprised between 80,000 Da and 160,000 Da and LMWs between 30,000 and 51,000 Da (Payne et al., 1980). The larger glutenin polymers are stabilized by inter-chain disulfide bonds.

It is known that during the mixing of cereal flours with water, gluten is typically formed, a colloidal, viscous and elastic protein mixture, consisting mainly of gliadin and glutenin.

The gluten present in workable wheat mixtures has the ability to retain the gases produced during fermentation.

Furthermore, the higher molecular weight gluten polymers help in the formation of a more elastic structure in the bread (Atwell, 2001).

Flour is called "strong" when it has a higher concentration of gluten. This flour absorbs a large quantity of water to make an elastic mixture and has a high ability to retain carbon dioxide, creating a good protein cross-linking (Stringher, 2006).

It is also known that there are people who suffer from disorders, ailments and/or pathologies associated with gluten intake, such as celiac disease, Non Celiac Gluten Sensitivity (NCGS), gluten ataxia, Duhring's dermatitis herpetiformis, gluten allergy.

Gluten is characterized by a high content of glutamine (26-53%) and proline (10-29%) which makes it resistant to degradation by gastrointestinal enzymes in humans. In celiac patients, CD-immunogenic peptides, with an amino acid content greater than 8, are able to reach the small intestine, pass through the epithelial barrier and trigger the inflammatory cascade.

Therefore, in such people, both adults and children, the ingestion of foods containing gluten, even if only in small quantities, can cause, in the case of celiac disease, an immune reaction in the small intestine, giving rise to a chronic inflammation that results in the ablation of the intestinal villi, accompanied by a symptomatology that varies from case to case; often the immune response causes duodenal lesions. The flattened absorbent surface can reduce, or even completely prevent, the absorption of nutrients, such as proteins, fats, carbohydrates, vitamins and mineral salts, causing malnutrition and imbalances.

In general, these disorders, ailments and/or pathologies, regardless of whether they are configured as real diseases or not, have in common the fact that immune response processes are triggered in the organism, and therefore they will be collectively indicated in this description as "immune-mediated reactions", or even just "immune—mediation". Where this immune-mediation is caused by gluten, this will be specified.

For example, celiac disease is an autoimmune disease caused by the ingestion of gluten, which causes atrophy of the intestinal villi and is frequently characterized by chronic diarrhea and slowing of growth, but not only. This pathology is one of the most common food intolerances and affects about one in every 100 individuals, mostly in Europe, North and South America and Australia.

Even today, the most common and widespread methods for dealing with reactions immune-mediated by gluten are based on strictly gluten-free foods and diets.

People with pathologies immune-mediated by gluten can therefore eat naturally gluten-free foods, such as meat, fish, fruit, vegetables, eggs, milk, potatoes or rice, as well as eat the specially prepared gluten-free foods or diet products available on the market. The latter, being made without gluten, often do not have sensory and organoleptic characteristics comparable with the same prepared foods which instead contain gluten. This is because gluten has considerable technological properties and allows to obtain products with a high degree of palatability.

Currently, in Italy, Europe and the USA there are specific rules and regulations which regulate the wording on the maximum quantity of residual gluten present in foods.

For example, the Implementing Regulation (EU) no. 828/2014 of the European Commission of 30 Jul. 2014, which came into effect on 30 Jul. 2016, defines as "gluten" the protein fraction of wheat, rye, barley, oats or their cross varieties as well as their derivatives, which some people are intolerant of, and which is insoluble in water and in 0.5 M sodium chloride solution; in which all the species of Triticum are included as "wheat".

In accordance with these definitions:

the wording "gluten-free" is allowed only where the gluten content of the food sold to the final consumer does not exceed 20 mg/kg (20 ppm);

the wording "with very low gluten content" is allowed only where the gluten content of the food sold to the final consumer, consisting of one or more ingredients obtained from wheat, rye, barley, oats or their cross varieties, especially processed to reduce the gluten content, or containing one or more of these ingredients, does not exceed 100 mg/kg (100 ppm).

This quantity must be determined by the ELISA method with monoclonal antibody R5, Mendez method, type I analytical method from the Codex Alimentarius.

However, it should also be noted that cereal-based food products are generally the foods that provide the greatest contribution of carbohydrates in the diet, and are very important on a nutritional level.

Consequently, a complete elimination of these products from the diet is not recommended, as it unbalances the content of nutritional substances.

Over the last few years, various methods have been proposed intended to provide foods with cereals containing gluten that can be configured as an alternative to the current gluten-free products.

For example, in WO-A-20140/33765 (treatments with lactic bacteria and fungal proteases intended for the complete degradation of gluten) and in U.S. Pat. No. 9,427,008 B (use of fungi able to selectively remove gluten proteins from wheat) methods intended to completely remove or degrade gluten proteins are described.

In a similar way, in WO-A-2014/053891 (chemical-physical treatments intended for the structural modification of gluten proteins), the gluten proteins are degraded by treatment with microwaves.

However, methods based on the complete removal/degradation of gluten are associated with a considerable deterioration of the technological and sensorial properties of the flours treated, such as to compromise obtaining products with structural and flavor characteristics appreciated by consumers.

From this perspective therefore, other types of methods seem more promising, based on the deactivation of gluten proteins, which provide to modify the antigenic epitopes of gluten proteins that trigger immune-mediated reactions.

In particular, these methods can provide to mask the gluten by means of transglutaminases, enzymes able to carry out a transamidation reaction between the glutamyl residue, present on the gluten proteins, and lysine, added as a reaction substrate.

The greater potential of this approach compared with those described above is motivated by the fact that the gluten, during the transamidation reaction, is not degraded, but only modified, leaving the technological properties of the treated flour unaltered.

The insertion of lysine mediated by transglutaminase into the gluten proteins prevents the initiation of the immune response in celiac subjects (Elli, L. et al., 2012, "Immunological effects of transglutaminase-treated gluten in coeliac disease." Human Immunology 73, 992-997), thus opening up spaces for alternatives to the gluten-free diet.

Moreover, the insertion of lysine mediated by transglutaminases also occurs on the glutamyl residues present on the epitopes recognized by the R5 antibody, which is currently the official method of quantification of gluten established by the Codex Alimentarius. Consequently, the efficacy of the transamidation process in masking gluten by means of transglutaminases can be measured analytically using the R5 antibody itself.

At the moment, two patent documents are known which, although with different approaches, use transglutamination to mask the gluten: WO-A-2015/052665 (WO'665) and WO-A-2008/053310 (WO'310).

In the approach proposed in WO'310, however only on a laboratory scale, microbial transglutaminase is added to a very diluted aqueous solution containing wheat flour and ethyl ester lysine.

Despite the considerable dilution of the system, an element that generally favors the success of a reaction, increasing the possibility that the different reagents can meet, the application of the method does not allow to obtain products suitable for use by celiac patients; the gluten content was in fact far higher than the permitted limit of 20 ppm and 100 ppm From internal experimental tests carried out by the Applicant on a pilot plant, with significant and easily transferable quantities of reagents even on an industrial scale, replicating the method described in WO'310, it appears that the bread thus produced gave a gluten content higher than 250 ppm.

It should also be noted that the industrial applicability of the method described in WO'310 is limited both by the need to carry out a thorough drying of the intermediate detoxified mixture, in order to make it suitable for the industrial bread-making process, otherwise too diluted, and also by the considerable costs of the lysine ethyl ester used.

Furthermore, drying entails a considerable increase in production times and construction costs for the plants that require special equipment.

Moreover, the Applicant has carried out internal baking tests with the intermediate mixture obtained according to the teaching of WO'310, which demonstrated the loss of the elastic characteristics related to gluten on the finished product. The bread produced was very fragile and strong "off-flavors" were present. Consequently, the approach proposed in WO'310 has great limits that are difficult to overcome in terms of the balance between costs, process complexity and sensory qualities of the product obtained, as well as a final gluten content that is too high.

With regard to application WO'665, this document proposes a method that attempts to overcome the technological and cost difficulties described above for WO'310.

The authors propose to extract the lysine necessary for the transamination reaction directly from the yeast S. cereviasiae; tests carried out by the Applicant have shown that this approach, already for productions carried out on a laboratory scale, is greatly limited both due to the poor extraction efficiency of lysine from the yeast and also due to the organoleptic characteristics imparted by the yeast itself to the final product. The tests carried out by the Applicant have in fact indicated that the extraction of lysine from yeast, even using treatments which are in any case complex, combined with sonication and thermal excitation using microwaves, is not very efficient (Applicant's internal tests: bread with gluten between 5000 and 7000 ppm). This result can be attributed to a poor mobility of the reagents which leads to a reduced reaction yield.

It should be further highlighted that it is not possible to overcome the low extraction yields by increasing the quantity of yeast used, since this is characterized by peculiar aromatic notes that negatively impact the acceptability of the finished product by the consumer. If developed on an industrial scale, the process to produce lysate proposed in WO'665, that is, the liquid part resulting from the treatment of the yeast put in water and subsequently subjected to extraction treatment and subsequent centrifugation or filtration, would then determine high accumulations of waste products, at the moment without obvious solutions to manage it.

Alongside a careful evaluation of the process to produce lysate, identified by the Applicant as a very important point of the method, the entire bread-making process proposed in WO'665 was also studied. During the tests, different ways of adding ingredients, variable mixing times, different fermentation times and also different ratio between the different ingredients were tested. In none of the tests carried out was it possible to obtain gluten values lower than 5000 ppm.

Other types of methods based on gluten deactivation provide the hydrolysis, in particular the removal, of the antigenic epitopes associated with the glutamine residues, by means of enzymatic proteolysis.

For example, it is known to use the fungal prolyl-endopeptidase (AN-PEP), derived from *Aspergillus niger*.

Prolyl endopeptidase is able to selectively break the prolyl-glutamine sequence in proteins and it has been shown that proteolytic degradation by AN-PEP can effectively reduce the immunogenicity of gluten. This enzymatic approach is the basis of numerous oral supplements containing AN-PEP, which deactivate the gluten proteins in the stomach before they reach the duodenum. Currently this method does not represent an alternative to the gluten-free diet for celiac patients, however, numerous studies are underway on the use of AN-PEP for the protein deactivation of gluten in wheat flour (Kumar et. Al. 2019, "Targeted degradation of gluten proteins in wheat flour by prolyl endoprotease and its utilization in low immunogenic pasta for gluten sensitivity population", Journal of Cereal Science, 87, 59-67). The results are promising but the target value of 20 ppm of gluten, required by the Gluten Codex Alimentarius, has not yet been reached.

Another document that illustrates methods based on proteolysis is patent U.S. Pat. No. 7,563,864 B, which documents the efficacy of peptidases in degrading the toxic gluten epitopes and making them unable to activate T cells related to celiac disease.

U.S. Pat. No. 8,778,338 B proposes a combination of enzymes consisting of specific glutamine endoproteases and a prolyl endopeptidase to be administered in the form of powder or tablets.

U.S. Pat. No. 8,796,201 B proposes the administration of an effective dose of glutenase (including endopeptidases) in order to reduce the levels of toxic oligopeptides deriving from gluten, thus attenuating or eliminating the negative effects of gluten.

In the above patent, reference is made to the treatment of a liquid food, concentrated fruit juice, with AN-PEP 200 U/g gluten for 1 hour before the test on celiac patients, in order to obtain the complete digestion of the gluten.

US-A-2016/0114009 proposes treatment with peptidase preparations for oral administration to celiac patients, treatment of food supplements and liquid foods. No references are made to particular experimentation conditions.

Applications WO-A-2012/174127 and WO-A-2014/011662, and the applications cited therein as references, propose to use proteases that deactivate the gluten following ingestion, for the production of a safer product containing gluten for patients suffering from gluten intolerance. There is no specific reference to procedures dedicated to the treatment of foods containing gluten before ingestion.

The malting of cereals is also a valid enzymatic approach in order to deactivate gluten. Malting consists in transforming a kernel of a cereal through a step of hydrating the seed, followed by embryonic development, which induces the synthesis of amylolytic and proteolytic enzymes.

The latter spread in the endosperm and hydrolyze the reserve substances, starch and proteins (gluten); the energy obtained is then used to produce the rootlets and the embryonic stem of the plant.

It has been shown that the enzymes induced by the germination of wheat, barley and rye can hydrolyze gluten into non-toxic fragments for people prone to pathologies immune-mediated by gluten and that this procedure, if associated with other enzymatic treatments, can allow to obtain a flour with a low content of immunoactive gluten (Luoto S. et al. (2012). "Malt hydrolysates for gluten-free applications: Autolytic and proline endopeptidase assisted removal of prolamins from wheat, barley and rye". Journal of Cereal Science 56, 504-509). However, this technique does not allow, if applied alone, to obtain raw materials with low immunogenicity for the population subject to pathologies immune-mediated by gluten.

In general, known methods for the selective deactivation of gluten are not very applicable for large-scale production of food products in industrial plants, since they require specific equipment that increases the management and operating costs of the plants, or they are not efficient enough to deactivate gluten to a satisfactory level, or even have too long reaction and process times.

There is therefore a need to perfect a method to prepare a mixture to make food products suitable for people suffering from pathologies immune-mediated by gluten, which can overcome at least one of the disadvantages of the state of the art.

In particular, one purpose of the present invention is to provide a method to prepare a mixture that can be applicable for large-scale industrial productions, without increasing the costs and complexity of the industrial plants.

Other limitations and disadvantages of conventional solutions and technologies will be clear to a person of skill after reading the remaining part of the present description with reference to the drawings and the description of the embodiments that follow, although it is clear that the description of the state of the art connected to the present description must not be considered an admission that what is described here is already known from the state of the prior art.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the present invention or variants to the main inventive idea.

In accordance with the above purposes, some embodiments concern a method to prepare a mixture to make cereal-based food products natively containing gluten, in particular food products that are suitable for people suffering from pathologies immune-mediated by gluten.

In some embodiments, the method comprises a step that provides to mix cereal flour containing gluten with at least one proteolytic enzyme in the presence of an aqueous solution, in order to at least partly remove from the gluten, by means of enzymatic proteolysis, antigenic epitopes of gluten proteins that trigger pathologies immune-mediated by gluten, obtaining a hydrolyzed flour solution.

In some embodiments, the method also provides a step comprising the preparation of a mixture obtained by mixing a hydrolyzed flour composition, deriving from the hydrolyzed flour solution as above, with a transglutaminase enzyme supplied in powder and with a source of lysine, thereby at least partly deactivating, by means of transamidation with amino acid residues of said lysine, the remaining antigenic epitopes of gluten proteins.

Furthermore, according to possible embodiments, the source of lysine can be a liquid source and, in this case, it can constitute all and the sole source of liquid necessary to obtain the mixture as above.

According to other possible embodiments, the source of lysine as above can be a dense source, in particular solid, more in particular in granular or powder form.

Advantageously, the present invention achieves the purpose of both supplying a mixture based on cereal flour which has a reduced immunogenicity of gluten and is therefore suitable for people suffering from pathologies immune-mediated by gluten, and also of supplying a mixture and corresponding oven-baked products which, moreover, can be produced industrially.

In some embodiments, the cereal flour can be obtained by grinding cereal seeds deriving both from non-genetically modified organisms, and also from genetically modified organisms that contain a very low quantity of gluten.

In other embodiments, the method can comprise malting the cereal seeds prior to grinding.

Some embodiments described here also concern a mixture obtainable by means of a method in accordance with the present description.

Other embodiments concern a method to prepare an oven-baked food product, comprising baking a mixture obtainable by means of a method in accordance with the present description in an oven.

Other embodiments concern a method to prepare food pasta comprising preparing a food mixture obtainable by means of a method in accordance with the present description, in order to mix and homogenize it, and to work it mechanically, in order to define the shape and thickness of the food pasta.

Other embodiments concern a food product, obtainable starting from the food mixture described here.

Advantageously, the method described here allows to obtain a food mixture and oven-baked food products suitable for consumption both by people suffering from celiac disease, having an immunoactive gluten content lower than 20 ppm, and also by people suffering from non-celiac gluten sensitivity having an immunoactive gluten content lower than 100 ppm.

Furthermore, the method described here can be directly industrialized and allows to supply a mixture and products obtainable therefrom by exploiting already existing industrial production plants, without needing to provide additional apparatuses, with a consequent reduction in costs and processing times.

These and other aspects, characteristics and advantages of the present disclosure will be better understood with reference to the following description and attached claims.

The various aspects and characteristics described in the present description can be applied individually where possible. These individual aspects, for example aspects and characteristics included in the description or in the attached dependent claims, can be the object of divisional applications.

BRIEF DESCRIPTION OF THE DRAWINGS

These and other aspects, characteristics and advantages of the present invention will become apparent from the following description of some embodiments, given as a non-restrictive example with reference to the attached drawings wherein.

DETAILED DESCRIPTION OF SOME EMBODIMENTS solution, possibly diluted, which can We will now refer in detail to the various embodiments of the invention, of which one or more examples are shown in the attached drawing. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to the sequence of steps as described in the following description. The present description can provide other embodiments and can be obtained or executed in various other ways. We must also clarify that the phraseology and terminology used here is for the purposes of description only, and cannot be considered as limitative.

The present invention concerns a method to prepare a mixture to make cereal-based food products natively containing gluten. These food products are suitable for people with pathologies immune-mediated by gluten, such as people with celiac disease, non-celiac gluten sensitivity (NCGS), gluten ataxia, Duhring's dermatitis herpetiformis, gluten allergy.

In the present description, the terms "immunoactive" and "deactivated" are used with reference, respectively, to the presence and absence of antigenic epitopes in gluten proteins, which trigger pathologies immune-mediated by gluten.

In cases where the term "gluten" is used without specifying "immunoactive" or "deactivated", it is to be understood as "immunoactive gluten", unless otherwise specified.

Figure 1:
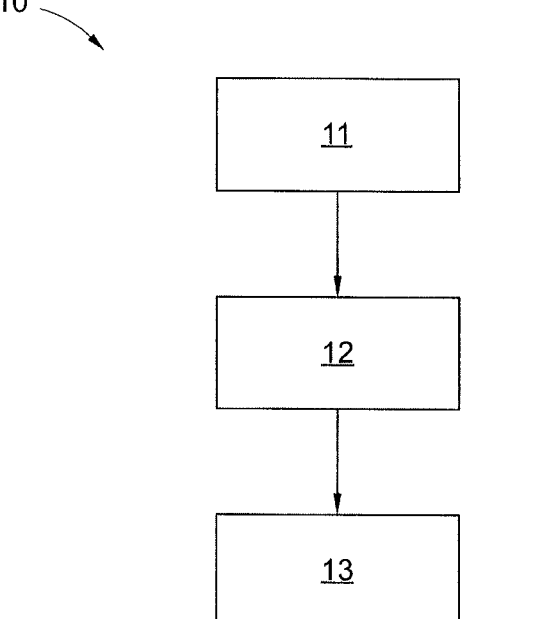
FIG. 1 is a block diagram showing a possible sequence of steps provided in some embodiments of the method described here.
Figure 2:
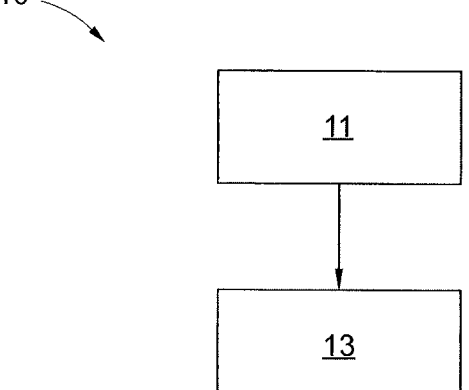
FIG. 2 is a block diagram showing a possible sequence of steps provided in other embodiments of the method described here.

In some embodiments, described using the attached FIGS. 1 and 2, the method 10 comprises making available a cereal flour, containing gluten.

In particular, the cereal flour can be obtained starting from cereal seeds.

In some embodiments, the cereal seeds can be cereal seeds of the genus "Triticum" and/or cereals with a low gluten content, both immunoactive and also deactivated, and/or cereals with a low immunoactive gluten content, and/or other species of cereals, for example barley, rye or spelt.

In some embodiments, the cereal seeds can be derived from non-genetically modified (non-GMO) organisms.

In some embodiments, the cereal seeds derived from non-genetically modified organisms can contain a quantity of immunoactive gluten between 21,000 ppm and 250,000 ppm.

In other embodiments, the cereal seeds can be derived from genetically modified organisms (GMOs).

In some embodiments, the cereal seeds derived from genetically modified organisms (GMOs) can contain a quantity of immunoactive gluten lower than 10,000 ppm, in particular between 1000 ppm and 8000 ppm, more in particular between 2000 ppm and 7000 ppm. ppm, even more in particular between 3000 ppm and 5000 ppm.

In some embodiments, the genetically modified organisms can be obtained by means of "plant breeding" techniques, for example classic plant breeding, Clustered Regularly Interspaced Short Palindromic Repeats (CRISPR-Cas), Talens, zinc finger nucleases, and more.

In some embodiments, the genetically modified organisms can be obtained by means of "gene editing" and "genome editing" technologies.

In some embodiments, seeds and flours obtained from varieties of GMO wheat can be used, as described for example in US patent U.S. Pat. No. 8,859,850 B.

In some embodiments, the GMO organisms can comprise, by way of example, the experimental lines developed by prof. Barro (Gil-Humanes, Javier; Pistón, Fernando; Tollefsen, Stig; Sollid, Ludvig M.; Barro, Francisco (2010): Effective shutdown in the expression of celiac disease-related wheat gliadin T-cell epitopes by RNA interference. In Proceedings of the National Academy of Sciences of the United States of America 107 (39), pp. 17023-17028. DOI: 10.1073/pnas.1007773107; Rustgi, S., von Wettstein, D., Ankrah, N., Brew-Appiah, R. A. T., Wen, R., Mitchell, S. M., Gemini, R., Reisenauer, P. (2015). Celiac-safe wheat genotypes: a dietary solution to the gluten-induced disorders. In: Annual Wheat Newsletter, edited by Rapp, W. J., Kansas State University, Manhattan, Kansas, USA; Rustgi, S., von Wettstein, D., Ankrah, N., Brew-Appiah, R. A. T., Wen, R., Mitchell, S. M., Gemini, R., Reisenauer, P. (2015). Celiac-safe wheat genotypes: a dietary solution to the gluten-induced disorders. In: Annual Wheat Newsletter, edited by Rapp, W. J., Kans. State University, Manhattan, Kansas, USA).

In some embodiments, the step in which the cereal flour is made available can provide a malting operation of the cereal seeds.

This malting is preferably carried out, for example, in the event cereal seeds deriving from non-genetically modified organisms are used.

In some embodiments, the malting can comprise the germination of cereal seeds at ambient temperature, in the presence of a percentage of humidity greater than 40%, for a period of time comprised between 20 and 90 hours, for example 24, 48, 60, 72 hours.

In some embodiments, the malting can later provide one or more operations to block the germination at a desired level.

The Applicant has verified that by using cereal seeds deriving from non-GMO organisms, for example from common wheat, a germination carried out for 72 hours can reduce the gluten content by 67%, that is, from about 100000 ppm to about 30000 ppm.

Advantageously, at least in the event cereal seeds deriving from GMO organisms are used, the malting can be optional: it can be carried out, for example, if there is a desire to further reduce the gluten content in the seeds, or it can be avoided, if the reduced gluten content in the starting seeds is considered acceptable.

In some embodiments, the rootlets are subsequently separated from the germinated cereal seeds.

In some embodiments, the cereal flour can be obtained by grinding the cereal seeds, malted or not.

If the seeds have been malted, the flour is a malted flour.

For example, the grinding can be carried out by means of a rotor mill, set at a rotation speed of 18000 rpm and which has a sieve with a mesh size of about 500 micrometers.

In some embodiments, which can be combined with all the embodiments described here, the method 10 comprises a first step 11 of enzymatic hydrolysis of the gluten proteins contained in the cereal flour, in order to obtain a hydrolyzed flour solution. This allows, by means of enzymatic proteolysis, to at least partly remove from the gluten the antigenic epitopes that trigger pathologies immune-mediated by gluten.

In some embodiments, the enzymatic hydrolysis can provide to make the flour react with an enzyme of the protease class, also known as proteinase or peptidases or proteolytic enzymes, that is, an enzyme capable of catalyzing the cleavage of one or more peptide bonds of the proteins.

These enzymes are also sometimes classified in the hydrolase family, in particular when the enzyme reaction mechanism provides the intervention of one or more water molecules to operate the cleavage of the peptide bond, which in this case is configured as a hydrolysis.

In some embodiments, the protease enzyme can be a prolyl-endopeptidase enzyme from *Aspergillus niger* (AN-PEP).

In some embodiments, the protease enzyme can be supplied directly in an aqueous therefore be indicated as a proteolytic solution. In such embodiments, if the protease enzyme is supplied directly as a proteolytic solution, it can be an acid solution, in particular with a pH comprised between 2 and 6.5, even more in particular between 3 and 5, even more in particular between 3.5 and 4.5.

In some embodiments, the proteolytic solution can comprise a suitable buffer to maintain the correct acidity.

In particular, a buffer of a weak acid can be present, for example a carboxylic, monoprotic or polyprotic acid with suitable pKa, or with suitable pKas, to maintain the acidity values of the proteolytic solution described. For example, the buffer can be an acetic/acetate acid buffer.

In some embodiments, the concentration of the buffer in the proteolytic solution can be comprised between 10 mM and 400 mM, for example 10 mM, 100 mM, 200 mM.

In some embodiments, the buffer can be added to the proteolytic solution in order to determine, or better regulate, the acidity value of the solution.

In other embodiments, the protease enzyme can be supplied in solid form, in particular in granular or powder form, which is mixed with the flour, and an aqueous solution is then added to the mixture thus obtained, possibly in the presence of a buffer. It is, however, understood that also in this case the method described here involves the use of a proteolytic enzyme in the presence of an aqueous solution.

In some embodiments, the mixing of the flour with the proteolytic enzyme in the presence of an aqueous solution can be carried out without providing any stirring.

In other embodiments, the mixing can, on the other hand, provide to carry out a stirring at a temperature suitable to carry out the proteolysis, that is, at a controlled proteolysis temperature.

In some embodiments, the mixing can be carried out at a proteolysis temperature comprised between 30° C. and 60° C., for example 30° C., 40° C., 50° C.

In some embodiments, if stirring is provided, this can be carried out under a specific regimen, in particular between 200 rpm and 800 rpm, more in particular between 400 rpm and 600 rpm, for example 450 rpm, 500 rpm, 550 rpm.

In some embodiments, the mixing time can be comprised between 60 minutes and 360 minutes, in particular between 120 minutes and 240 minutes, for example between 160 minutes and 200 minutes.

Advantageously, in all the embodiments described here, during the enzymatic proteolysis of the cereal flour the protease enzyme breaks the peptide bonds of the gluten proteins, deactivating them, in particular degrading or completely removing the antigenic epitopes, for example associated with the peptide residues containing glutamine.

The Applicant has found an immunoactive gluten content comprised between 252 and 6144 ppm in hydrolyzed cereal flours derived from non-GMO organisms, for example common wheat, previously subjected to malting.

The Applicant has found an immunoactive gluten content lower than 10 mg/kg in hydrolyzed cereal flours derived from GMO organisms, for example from the experimental lines developed by prof. Barro as above.

In embodiments described using FIGS. 1 and 2, the method described here provides a step 13 comprising the preparation of a mixture by mixing a hydrolyzed flour composition, directly or indirectly obtained or deriving from the hydrolyzed flour solution as above, with a transglutaminase enzyme supplied in powder and with a source of lysine, thereby at least partly deactivating, by means of transamidation with amino acid residues of said lysine, the remaining antigenic epitopes of gluten proteins.

In some embodiments, the enzymatic transglutamination can provide to react the hydrolyzed flour composition as above with an enzyme of the transglutaminase class, in the presence of a source of lysine.

In particular, the transglutaminase enzyme is an enzyme capable of catalyzing the formation of a peptide bond between a glutamine residue, present in the gluten proteins, and a lysine residue, supplied with the source of lysine, releasing a molecule of ammonia.

Advantageously, this reaction has the effect of protecting the glutamine residues of gluten proteins from recognition by the immune system of people who are immunosensitive to gluten, effectively deactivating the toxic effect of gluten, and therefore deactivating gluten.

The deactivation of gluten therefore occurs by "masking" the glutamine residues of gluten proteins, target of the immune system and therefore toxic epitopes, with residues of lysine, which is not attacked by the immune system.

In some embodiments, the transglutaminase enzyme can be a PROBIND TXo 11.0 enzyme, in particular with an activity of 1000 U/g, for example commercially available from BDF Natural Ingredients (Girona, Spain).

In some embodiments, schematically described by means of FIGS. 1 and 2 and which can be combined with all the embodiments described here, the step 13 of the method 10 comprises preparing the mixture as above by mixing the hydrolyzed flour composition as above with the transglutaminase enzyme supplied in powder and with the source of lysine, at least partly deactivating, by means of transamidation with amino acid residues of lysine, the remaining antigenic epitopes of gluten proteins.

Some embodiments described using FIG. 1 provide that, between step 11 and step 13, there are no further steps or intermediate workings and that, therefore, the hydrolyzed flour solution obtained from step 11 is directly used as a hydrolyzed flour composition in the subsequent enzymatic transglutamination of step 13. In such embodiments, step 11 is carried out preferably by using the protease enzyme supplied in solid form, for example in granular or powder form, which is mixed with the flour, then adding an aqueous solution as described above to the mixture thus obtained.

The embodiments described using FIG. 2 instead provide that, between step 11 and step 13, there is at least one further working step 12, described below. Also in these embodiments, a hydrolyzed flour solution is obtained by carrying out step 11. However, in these embodiments, step 11 is carried out preferably by using the protease enzyme supplied directly as a proteolytic solution. In this case, the hydrolyzed flour solution obtained from step 11 is subjected to step 12, described hereafter, and the hydrolyzed flour composition deriving from this step 12 is subsequently subjected to step 13.

In possible embodiments schematically described by means of FIG. 2, in fact, the method 10 additionally comprises the additional step 12 as above, which provides to centrifuge the hydrolyzed flour solution of step 11 in order to remove the liquid phase supernatant, containing the reaction residues, and obtain a hydrolyzed flour pellet. With the term "pellet" here and hereafter in the description we mean a granular agglomerate. In these embodiments, therefore, the pellet thus obtained is to be considered as the hydrolyzed flour composition that is subjected to step 13, since it derives from the hydrolyzed flour solution obtained from step 11 and centrifuged in step 12.

In some embodiments, the centrifugation of the hydrolyzed flour solution can be carried out under a specific centrifugation regimen, in particular between 5000 rpm and 7000 rpm, more in particular between 5500 rpm and 6500 rpm, even more in particular between 5800 rpm and 6200 rpm, for example 5800 rpm, 5900 rpm, 6000 rpm, 6100 rpm, 6200 rpm.

In some embodiments, the hydrolyzed flour pellet can be subjected to an operation of inactivating possible residual traces of protease enzyme, for example by heating for 20 minutes at 85° C.

In other embodiments, the source of lysine can be in dense form, in particular solid form, such as granular or powder form. For example, lysine ethyl ester can be used. In this case, a liquid source, in particular water, can also be added to the mixture. In this case, moreover, the method can be preferably carried out as in the embodiments described using FIG. 1, that is, directly using the hydrolyzed flour solution in step 13, that is, without carrying out step 12 which provides centrifugation.

In other embodiments, the source of lysine is a liquid source of lysine, in particular aqueous-based. In such a case, the method can preferably be carried out as in the embodiments described using FIG. 2, that is, by subjecting the hydrolyzed flour solution to step 12 and therefore the pellet thus obtained constitutes the hydrolyzed flour composition used in step 13.

Advantageously, in these embodiments, the fact that the lysine is supplied by means of a liquid source increases the mobility of the lysine molecules in the reaction medium, increasing efficiency and reducing the times of the enzymatic transglutamination reaction.

Advantageously, the quantity of water contained in the liquid source of lysine can be regulated so that it is all and the sole source of liquid necessary to obtain the mixture.

In these embodiments, therefore, the mixture has no further added liquid phase other than the liquid source of lysine, comprising exclusively the liquid source of lysine in place of the liquid phase normally used to obtain the mixture.

This characteristic allows to avoid further intermediate operations and steps, for example of dilution with water and/or reduction of the water content, and/or mixing, with a consequent reduction in costs and processing times.

In general, in any case, with the method of the present invention it is possible to obtain a mixture, whether it is a workable mixture or a poured mixture or a soft mixture in general, which can be used directly in existing industrial production plants.

In fact, the method 10 in accordance with the possible embodiments described here can be applied directly to the normal bread-making process or the process for producing other oven-baked products, even on an industrial scale, without having to make significant changes to existing plants, required to carry out enzymatic transglutamination.

With particular reference to the methods described in WO'665 and WO'310, the method 10 described here can be implemented in a simpler and more efficient manner in known industrial bread-making plants.

Furthermore, with particular reference to the embodiments described by means of FIG. 2 and which provide to use a liquid source of lysine, a series of experimental tests carried out by the Applicant have demonstrated that the solids:liquids ratio of the liquid source of lysine is advantageous in modulating the mobility of the reagents. The tests therefore allowed to identify the correct solids:liquids ratio which allows both to generate the quantity of lysine necessary for the enzymatic transamidation reaction, and also to obtain a final mixture that is perfectly workable even on an industrial scale.

In some embodiments, described using FIG. 2, the third step 13 can initially comprise mixing the ingredients supplied in powder form, that is, the hydrolyzed flour pellet and the transglutaminase enzyme, for a period of time comprised between 0.5 and 5 minutes, in particular between 1 and 3 minutes, for example 1, 2, or 3 minutes.

Subsequently, the liquid source of lysine can be added, further mixing for a period of time comprised between 10 and 30 minutes, in particular between 15 and 25 minutes, more in particular between 18 and 22 minutes, for example 18, 19, 20, 21, 22 minutes.

The Applicant has found that the toxicity of gluten for people suffering from pathologies immune-mediated by gluten can be advantageously reduced further if the mixing of the liquid source of lysine as above with the mixture of powdered ingredients is carried out at a temperature higher than ambient temperature, in particular at a temperature from 30° C. to 50° C., more in particular from 35° C. to 45° C., even more in particular from 38° C. to 42° C., for example 38° C., 39° C., 40° C., 41° C., 42° C.

The Applicant has verified that the mixture obtained by embodiments of the method 10 described here has a quantity of immunoactive gluten lower than 20 ppm, and is suitable to be consumed by people suffering from celiac disease.

The Applicant has verified that the mixture obtained by other embodiments of the method 10 described here has a quantity of immunoactive gluten lower than 100 ppm, and is suitable to be consumed by people suffering from non-celiac gluten sensitivity.

In embodiments that provide to use the liquid source of lysine, the latter can be obtained from a liquid vegetable extract containing lysine, in particular by mixing a vegetable substrate in water, subsequently subjecting the mixture to centrifugation and collecting the supernatant obtained from the centrifugation, which constitutes the liquid source of lysine.

In some embodiments, the vegetable substrate comprises legumes, for example soybean, and can be legume flour, for example soybean flour.

In some embodiments, the vegetable substrate comprises algae and can be algae flour.

The Applicant has found that legumes, and in particular soybean and algae, naturally rich in proteins, are also excellent sources of lysine.

The mixing time of the vegetable substrate in water can be comprised between 5 and 20 minutes, in particular between 7 and 15 minutes, more in particular between 8 and 12 minutes, for example 8, 9, 10, 11, 12 minutes.

The mixing can provide to apply a specific stirring regimen, for example between 150 and 450 rpm, in particular between 200 and 400 rpm, more in particular between 250 and 350 rpm, for example 250, 300, 350 rpm.

The centrifugation time can be comprised between 5 and 20 minutes, in particular between 7 and 15 minutes, more in particular between 8 and 12 minutes, for example 8, 9, 10, 11, 12 minutes.

The centrifugation can provide to apply a specific stirring regimen, for example from 5000 rpm to 7000 rpm, in particular from 5500 rpm to 6500 rpm, more in particular from 5800 rpm to 6200 rpm. Possible examples are 5800 rpm, 5900 rpm, 6000 rpm, 6100 rpm, 6200 rpm.

Advantageously, this process of extracting lysine from the vegetable substrate is cheaper and more industrially applicable than other known methods, which provide to use more expensive sources of lysine, for example commercial ones.

In particular, given the wide availability of legumes and/or algae, the lysine extraction process has low costs per unit of lysine added to the reaction.

In general, it should be noted that, starting from non-GMO organisms, which have an immunoactive gluten content of about 100000 ppm, it would be necessary, for example, to reduce the immunoactive gluten by 99.98% by weight in order to obtain flours suitable for celiac people.

Methods based exclusively on enzymatic transaglutamination, for example described in WO'665 and WO'310, require large quantities of enzyme and lysine to operate this reduction.

Methods based exclusively on a strong enzymatic proteolysis or on the use of completely deglutenized flours, for example described in WO-A-20140/33765, lead to a significant deterioration of the technological and sensory properties of the final mixture.

The present invention, on the other hand, allows to combine both methodologies to obtain in a surprising and advantageous manner a mixture without immunoactive gluten, or with a very low immunoactive gluten content, which does not require an excessive use of reagents in the enzymatic proteolysis and enzymatic transglutamination reactions, and which does not completely degrade gluten proteins, safeguarding their technological and sensory properties.

In addition to these advantages, there are also the additional advantages deriving from the possible use of GMO organisms, which have lower starting levels of immunoactive gluten.

Some embodiments also concern a mixture obtainable by means of a method in accordance with the present description.

Some embodiments also concern a method to prepare an oven-baked food product, for example bread, which comprises baking a mixture in accordance with the present description in an oven.

Some embodiments also concern a method to prepare food pasta which comprises:

supplying a mixture in accordance with the present description;

preparing the mixture in order to mix and homogenize it;

mechanically working the mixture to define the shape and thickness of the food pasta.

Possibly, it can be provided to cool the food pasta, or it is possible to not contemplate any cooling whatsoever.

Possibly, drying can also be provided, after the mechanical working step. For example, the drying can be carried out before the possible cooling.

Other embodiments concern a food product and a food pasta obtainable by means of the methods described here.

EXAMPLE 1

The following is an example of the application of some embodiments of the method 10 described here to obtain a mixture and a corresponding food product without immunoactive gluten, starting from common wheat containing 100000 ppm of immunoactive gluten, by means of malting, enzymatic proteolysis and enzymatic transglutamination. It should be noted, however, that within the scope of the present invention the malting step is optional.

The protease enzyme used in this case was MAXI-PRO PSP, containing prolyl-endopeptidase (AN-PEP) from *Aspergillus niger* (enzymatic activity of 10 U/g), commercially available from DSM (Netherlands).

The transglutaminase enzyme used in this case was PRO-BIND TXo 11.0 (activity 1000 U/g), commercially available from BDF Natural Ingredients (Girona, Spain).

The malting was carried out by leaving the wheat seeds to germinate for 72 at ambient temperature and humidity higher than 40%.

The seeds were then ground using a 500 μm sieve at 18000 rpm.

In this example, commercially available AN-PEP already in aqueous solution was used.

The malted flour was mixed with the commercial solution of AN-PEP at 30° C. and 450 rpm for 3 hours. The solution obtained was centrifuged at 6000 rpm for 10 minutes.

After eliminating the supernatant, the pellet was placed to heat for 20 min at 85° C. in order to inactivate the protease enzyme. The pellet was subsequently ground and mixed with the following ingredients:

| Ingredients | % w/w |
| --- | --- |
| Ground pellet of flour malted and hydrolyzed with AN-PEP | 61.30 |
| Salt (NACl) | 1.00 |
| Yeast | 2.01 |

-continued

| Ingredients | % w/w |
| --- | --- |
| Liquid source of lysine from soybean extract | 34.89 |
| PROBIND TXo 11.0 transglutaminase | 0.80 |
| Total | 100 |

The liquid source of lysine from soybean extract was obtained by subjecting the soybean proteins to mixing in water for 10 minutes at 300 rpm. Subsequently, the solution was subjected to centrifugation (6000 rpm for 10 min) and the supernatant recovered and used as a liquid source for the mixing step.

The quantities and proportions between ground pellet and lysine solution from soybean extract were used in the percentages normally used for flour and water for the traditional or industrial bread-making process.

Salt and yeast (powdered ingredients) were also added in the percentages normally used for the bread-making process.

In the procedure described in the example, the aqueous solution of lysine from soybean extract, that is, the supernatant obtained after centrifugation, was used with a double function: it represents the sole source of water necessary for the mixing step, in a quantity suitable to obtain a workable mixture even at an industrial level, and also it itself contains all and the sole lysine necessary for the enzymatic transglutamination reaction.

In this case, the soybean proteins have been chosen as the source of lysine, since the Applicant has found a high content thereof. However, the use of other legumes or of algae to extract lysine is not excluded.

The dry components, that is, ground pellet, salt, sugar, PROBIND TXo 11.0 and yeast, were mixed together for 2 minutes, then the liquid source of lysine from the soybean extract was added and the mixture was mixed for a total time of 20 minutes.

Once the mixing step was completed, the mixture was left to leaven (45 min, 32° C., 85% relative humidity) and then baked for 30 min at 200° C.

The oven-baked product thus obtained has a final gluten content, measured by the Applicant, equal to 85 ppm, and is therefore suitable to be classified with the wording "with very low gluten content" on the basis of Implementing Regulation (EU) no. 828/2014.

EXAMPLE 2

In this example, the same raw materials were initially used and the operations were carried out in the same way as in Example 1, up to the grinding of the seeds. However, unlike Example 1, at this point commercially available AN-PEP in granular form was used, which was mixed with the flour obtained from the grinding. Then an aqueous solution of acetate buffer at pH 4 was added, mixing was then carried out for 2 minutes and incubation at 30° C. for 3 hours.

Subsequently, the dry components necessary in this case were added to this composition, that is, salt, sugar, PRO-BIND TXo 11.0 and yeast. The source of lysine was then added, in this case in solid form. Once the mixing was complete, the mixture was left to leaven and then baked as in Example 1.

The oven-baked product obtained from Example 2 also has a final gluten content suitable to be classified with the words "with very low gluten content" on the basis of Implementing Regulation (EU) no. 828/2014.

It is clear that modifications and/or additions of steps may be made to the method 10 as described heretofore, without departing from the field and scope of the present invention.

It is also clear that, although the present invention has been described with reference to some specific examples, a person of skill in the art shall certainly be able to achieve many other equivalent forms of method 10 and products, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A method to prepare a mixture to make cereal-based food products natively containing gluten, said method comprising:
   a step comprising the mixing of cereal flour containing gluten with at least one proteolytic enzyme supplied in a proteolytic solution, in order to at least partly remove from said gluten, by means of enzymatic proteolysis, antigenic epitopes of gluten proteins that trigger pathologies immune-mediated by gluten, obtaining a hydrolyzed flour solution;
   a step comprising centrifuging said hydrolyzed flour solution in order to remove a liquid phase supernatant containing reaction residues and obtain a hydrolyzed flour pellet, which constitutes a hydrolyzed flour composition;
   a step comprising the preparation of a mixture obtained by mixing said hydrolyzed flour pellet, with a transglutaminase enzyme supplied in powder and with a liquid source of lysine, said liquid source of lysine constituting all and the sole source of liquid necessary to obtain said mixture, thereby at least partly deactivating, by means of transamidation with amino acid residues of said lysine, the remaining antigenic epitopes of gluten proteins.

2. The method as in claim 1, wherein said mixture has no further added liquid phase other than said liquid source of lysine.

3. The method as in claim 1, wherein said liquid source of lysine is obtained from a liquid vegetable extract containing lysine, wherein said liquid vegetable extract is obtained from a vegetable substrate comprising legumes or algae.

4. The method as in claim 1, wherein said cereal flour is obtained by grinding cereal seeds deriving from non-genetically modified organisms, containing a quantity of immunoactive gluten between 21000 ppm and 250000 ppm.

5. The method as in claim 1, wherein said cereal flour is obtained by grinding cereal seeds deriving from genetically modified organisms, containing a quantity of immunoactive gluten lower than 10000 ppm.

6. The method as in claim 1, wherein said cereal flour is obtained by grinding cereal seeds, previously subjected to malting, said malting comprising germinating the cereal seeds at ambient temperature in the presence of a percentage of humidity greater than 40%, for a period of time comprised between 20 hours and 90 hours.

7. The method as in claim 1, wherein said mixture has a quantity of immunoactive gluten lower than 20 ppm and is suitable to be consumed by people with celiac disease.

8. The method as in claim 1, wherein said mixture has a quantity of immunoactive gluten lower than 100 ppm and is suitable to be consumed by people with non-celiac gluten sensitivity.

9. A mixture obtained by the method of claim 1.

10. A method to prepare an oven-baked food product comprising baking in an oven the mixture of claim 9.

11. An oven-baked food product obtained by the method of claim 10.

12. A method to prepare food pasta which comprises supplying the mixture of claim 9, mixing and homogenizing said mixture, mechanically working said mixture to define a shape and thickness of the food pasta, and optionally subsequently drying after said step of mechanical working.

13. A food pasta obtained by the method of claim 12.

14. The method of claim 1, comprising subjecting said hydrolyzed flour pellet to heat treatment to inactivate residual protease activity before the step of.

* * * * *